(12) United States Patent
Katz

(10) Patent No.: US 10,581,159 B2
(45) Date of Patent: Mar. 3, 2020

(54) ELECTRICALLY SMALL QUASI ISOTROPIC EXTENDABLE ANTENNA

(71) Applicant: Daniel A. Katz, Kiryat Ono (IL)

(72) Inventor: Daniel A. Katz, Kiryat Ono (IL)

(73) Assignee: Mobit Telecom Ltd., Kiryat-Ono (IL)

( * ) Notice: Subject to any disclaimer, the term of this patent is extended or adjusted under 35 U.S.C. 154(b) by 289 days.

(21) Appl. No.: 15/787,884

(22) Filed: Oct. 19, 2017

(65) Prior Publication Data
US 2019/0123439 A1    Apr. 25, 2019

(51) Int. Cl.
| | |
|---|---|
| *H01Q 3/08* | (2006.01) |
| *H01Q 21/24* | (2006.01) |
| *G01S 19/36* | (2010.01) |
| *G01S 5/02* | (2010.01) |
| *H01Q 1/27* | (2006.01) |
| *G01S 3/02* | (2006.01) |
| *H01Q 7/00* | (2006.01) |
| *G01S 19/17* | (2010.01) |
| *G04R 60/06* | (2013.01) |

(52) U.S. Cl.
CPC ............... *H01Q 3/08* (2013.01); *G01S 3/02* (2013.01); *G01S 5/02* (2013.01); *G01S 5/0221* (2013.01); *G01S 19/17* (2013.01); *G01S 19/36* (2013.01); *H01Q 1/273* (2013.01); *H01Q 7/00* (2013.01); *H01Q 21/24* (2013.01); *G04R 60/06* (2013.01)

(58) Field of Classification Search
CPC .................................. H01Q 3/08; H01Q 21/24
USPC ......................................................... 343/872
See application file for complete search history.

(56) References Cited

U.S. PATENT DOCUMENTS

2008/0284654 A1* 11/2008 Burnside ............... G06K 7/0008
                                                              343/700 MS
2015/0318612 A1* 11/2015 Karlsson .................. H01Q 7/00
                                                                     343/852

FOREIGN PATENT DOCUMENTS

CN            2706880    *   6/2005   ............... H01Q 1/27

* cited by examiner

*Primary Examiner* — Andrea J Lindgren Baltzell

(57) ABSTRACT

The present invention discloses an extendable antenna for a portable communication device, made of two radiating wires each shaped as an open loop; a first loop fixed and a second loop movable between two positions: in parallel or alternatively vertically to the first loop; the parallel position suitable for compactly carrying the device in non-active mode, and the vertical combination configured to produce a substantially isotropic radiation pattern, particularly instrumental for satellite communications. According to one embodiment, this device is a satellite served Personal Locator Beacon (PLB) for Search and Rescue (SAR) of people in distress, configured to be wrist worn.

20 Claims, 8 Drawing Sheets

Round Antenna in Operational Position

Figure 1a – Round Antenna in Stowed Position
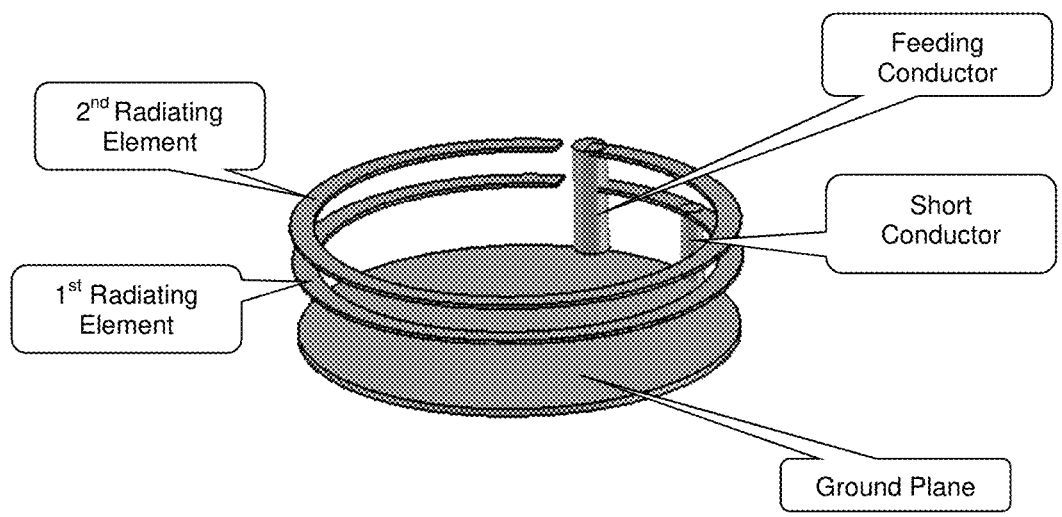
Figure 1b – Round Antenna in Operational Position
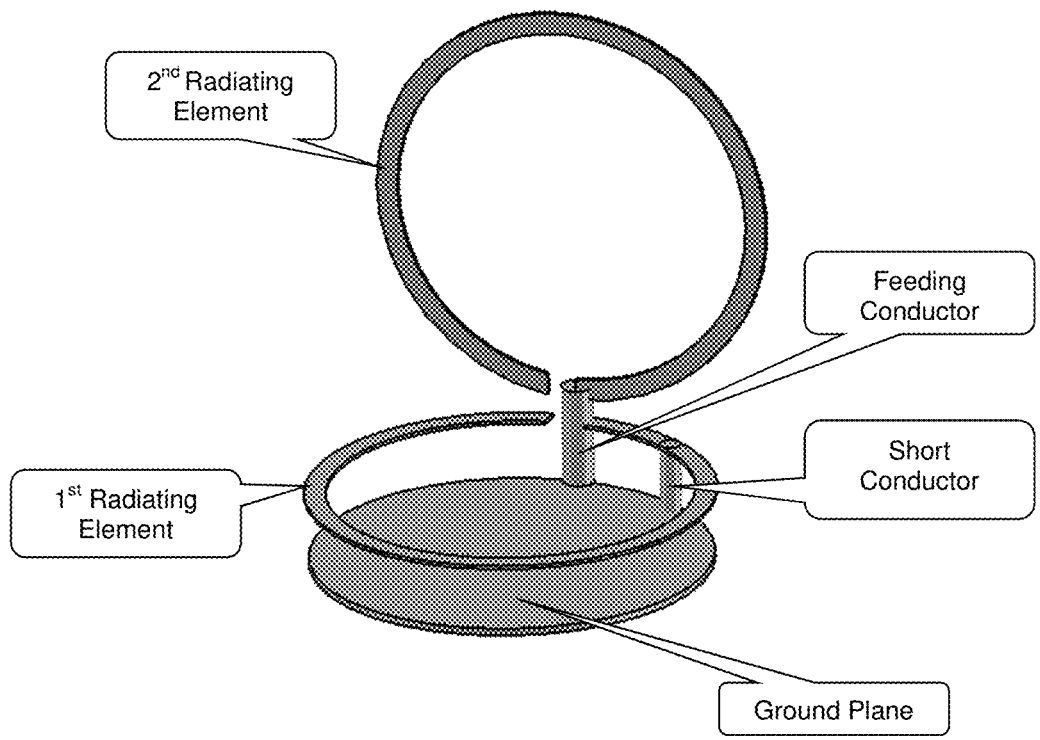

Figure 2a – Rectangular Antenna in Stowed Position
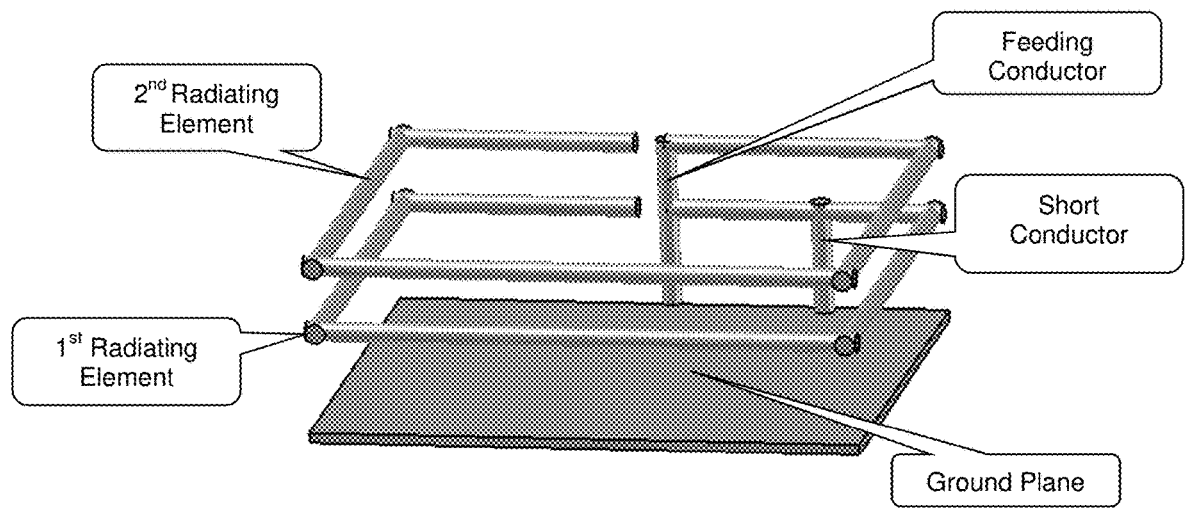
Figure 2b – Rectangular Antenna in Operational Position
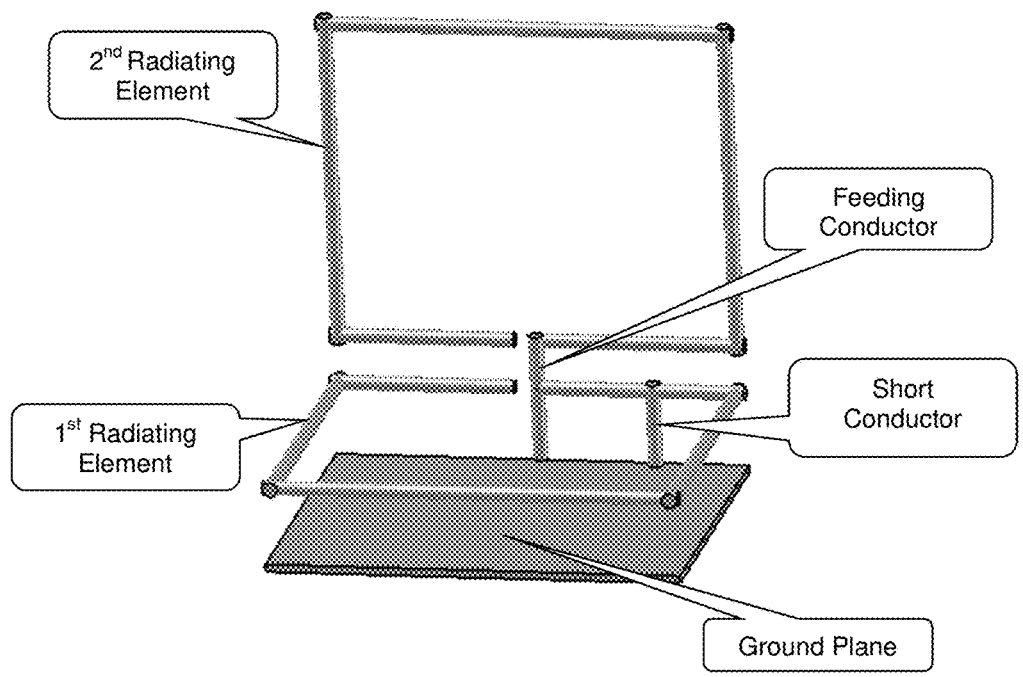

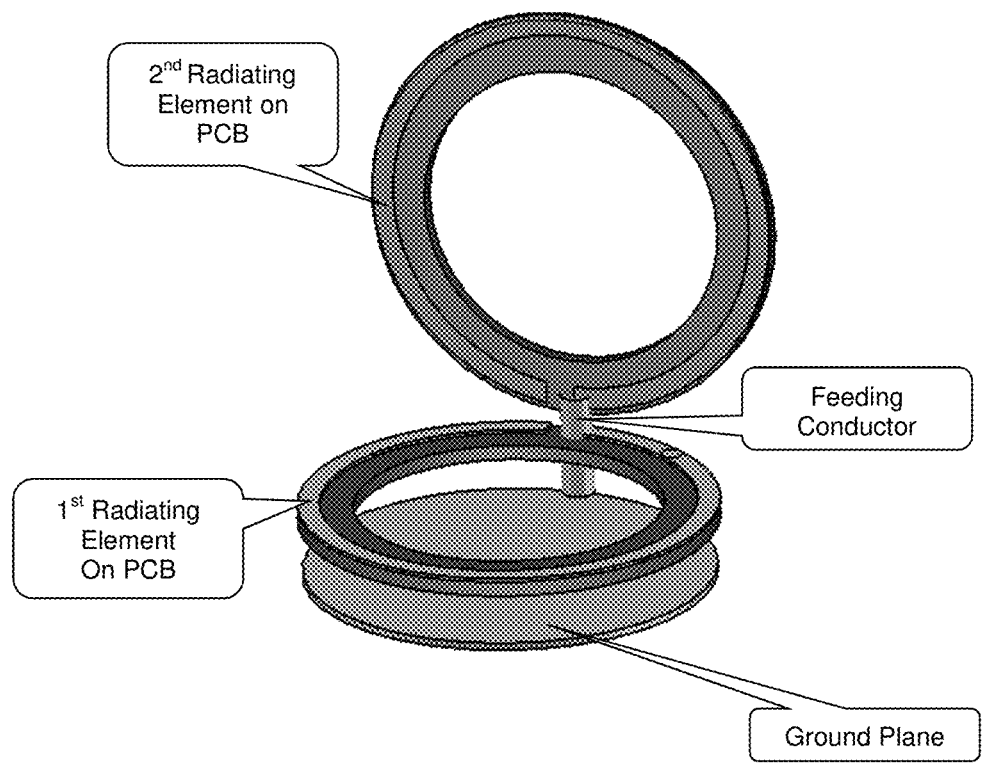
Figure 3 – Antenna Printed on PCB

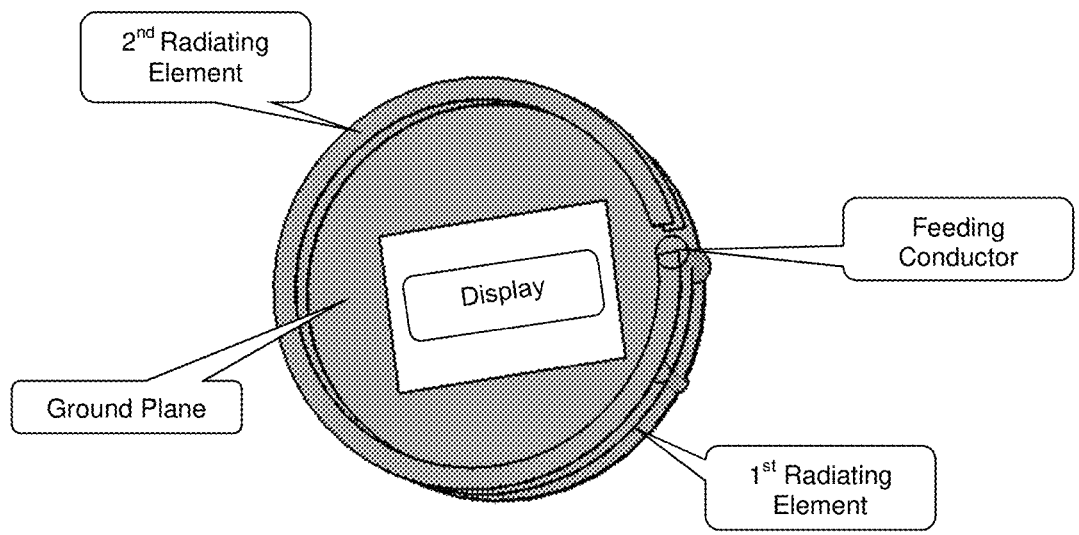
Figure 4 – Antenna in Stowed Position with Display Onboard

Figure 5a – Antenna Hinge – Front View
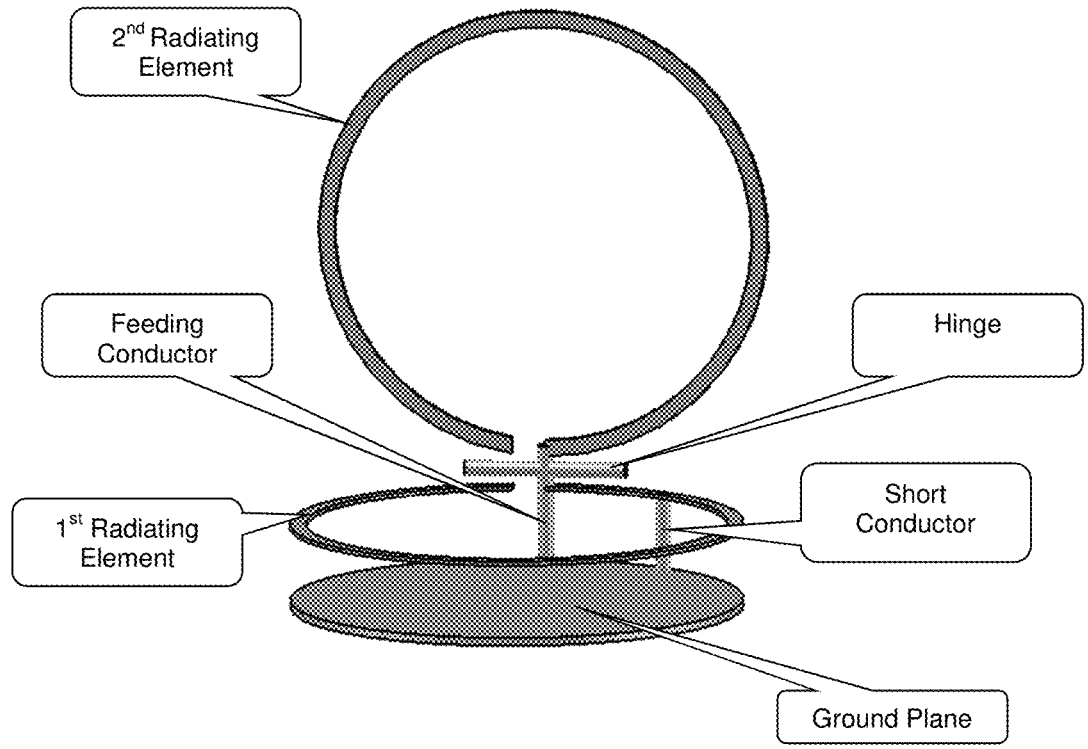
Figure 5b – Antenna Hinge – Side View
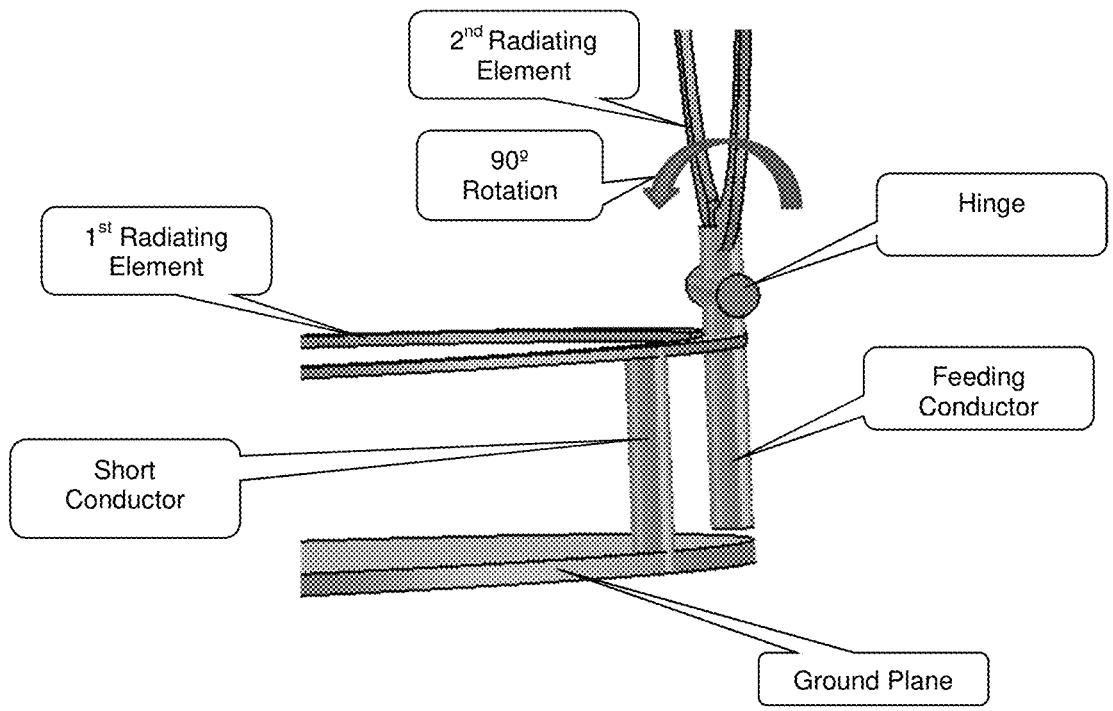

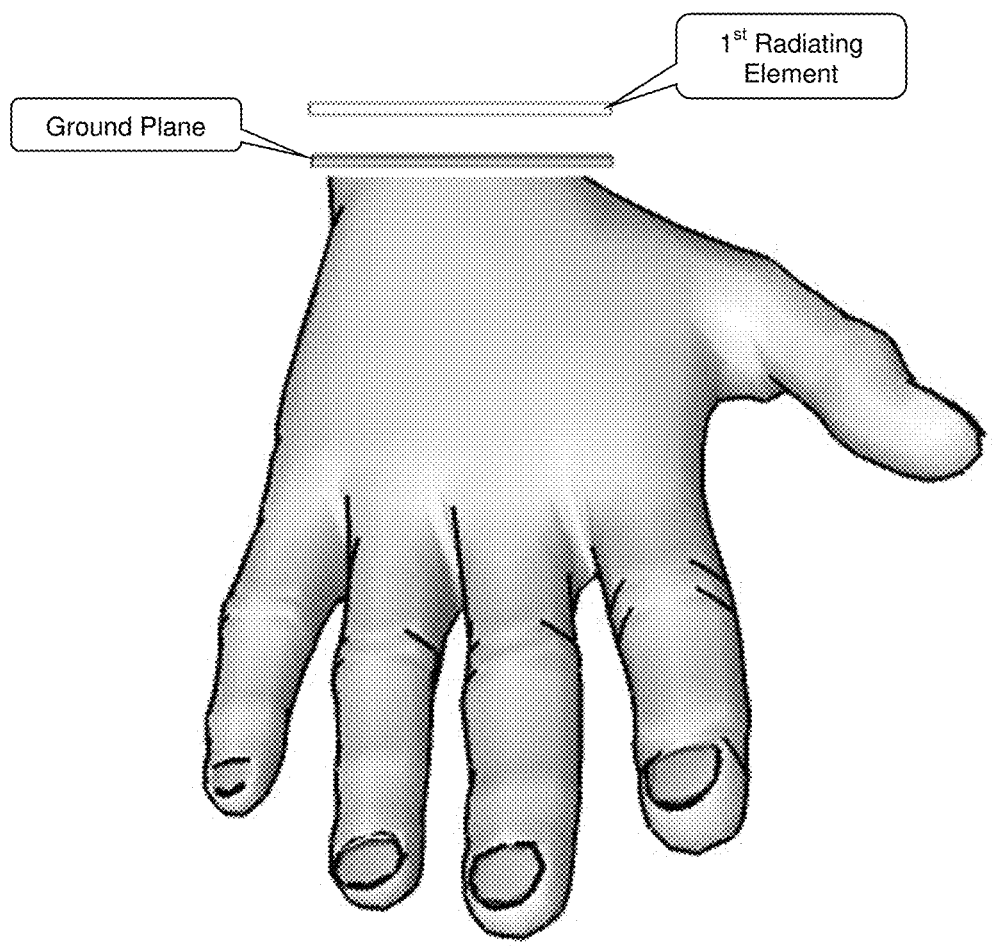
Figure 6 – Antenna Worn on the Wrist
(Communication Device not Shown)

Figure 7 - Block Diagram of Communication Device with Extended Antenna
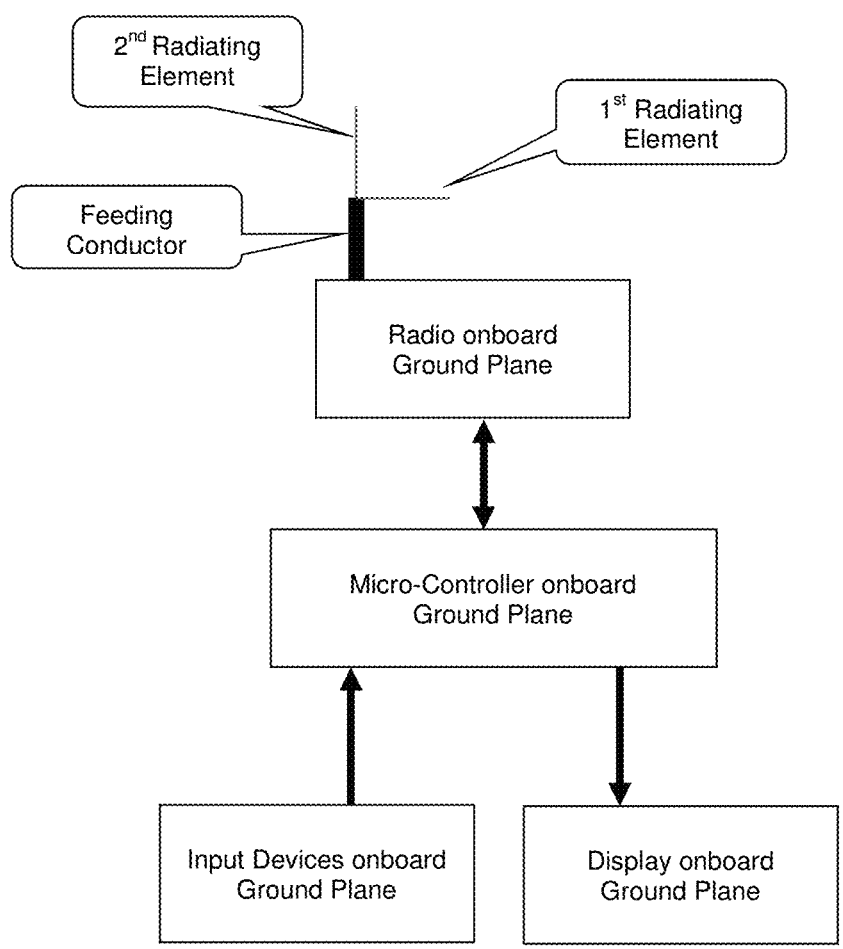

Figure 8 – Radiation Pattern vs. Elevation Angle
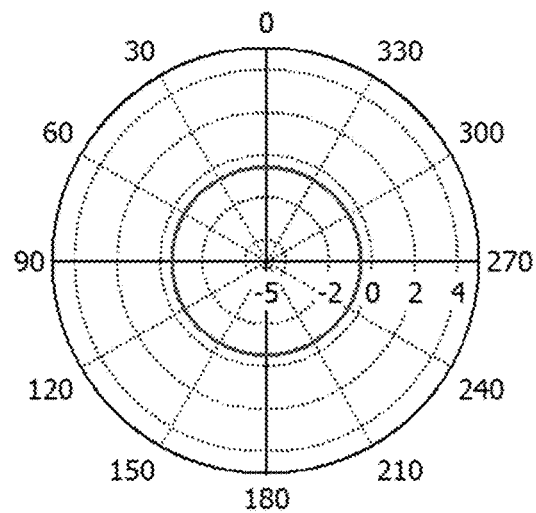
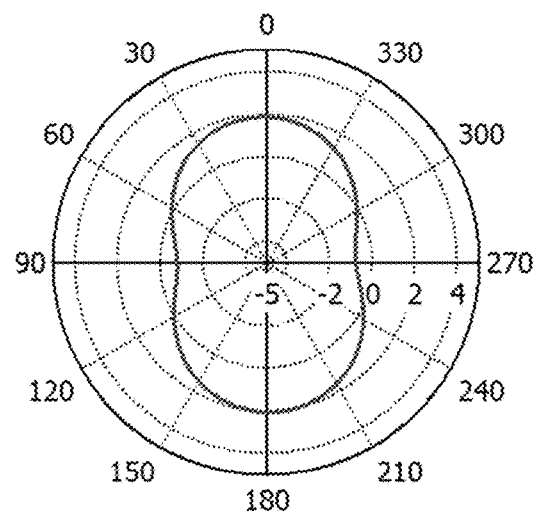
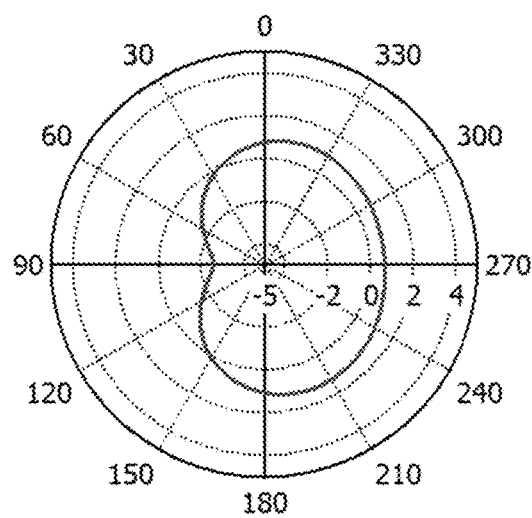

ELECTRICALLY SMALL QUASI ISOTROPIC EXTENDABLE ANTENNA

BACKGROUND OF THE INVENTION

The present invention relates to wireless communications and particularly to Radio Wave Antennas.

Efficiency of a transmitting antenna may be defined as the ratio between the power the antenna radiates and the power put into the antenna by a coupled transmitter. Usually, high efficiency is desirable in an antenna.

The physical size of an antenna, normalized to its operating wavelength, usually refers in the art as the "electrical size" of the antenna, so a "small antenna" usually means an Electrically Small Antenna (ESA). Typically, small antennas are desirable, particularly in mobile and portable devices, since enable to implement, carry and operate compact and user friendly devices.

Ideally, a small and efficient antenna should suit most wireless devices, however, a well-known rule trades off between these two aspects, limiting the miniaturization of an antenna, for a given efficiency. This rule also indicates that at least one of the antenna dimensions should be not less than $\lambda/4$, where $\lambda$ (lambda) is the transmission or reception wavelength, to achieve efficient radiation. For example, a $\lambda/4$ monopole structure, with a "whip" or "rod" about $\lambda/4$ long, electromagnetically coupled to a ground plane. For a 406 MHz radio $\lambda/4$ means 185 mm.

While smaller than $\lambda/4$ monopole antennas can be configured, this usually degrades the antenna efficiency. Thus, an efficient antenna for low frequency is not easily achieved in small dimensions.

Over the years, more complex shapes of antennas, many of them three dimensional, were been studied. Some fundamental works were been published by Wheeler [H. A. Wheeler, "Fundamental Limits of Small Antennas," Proceedings of The I.R.E. (IEEE), December 1947, pg. 1479-1484], Chu (Chu, L. J, "Physical Limitation of Omni-Directional Antennas", Journal of Applied Physics, Vol. 19, p. 1163-1175, 12/1948) and others. Based on these works, theoretical arguments predict that the minimal size for practical antennas will require a volume of half a sphere with radius r, where $kr=0.3$ ($k=2\pi/\lambda$). For example, at 406 MHz this means $r\sim40$ mm. In part of the literature the radius of this sphere is named a instead of r, so $ka=0.3$ is considered the minimum figure for an efficient ESA.

Yet, electrically small antennas not only suffer from some degradation in efficiency but also usually obtain a narrow bandwidth, which makes the ESA vulnerable to de-tuning due to proximity to metallic bodies, heavy snow, etc.

Not surprisingly, the present art covers several methods to configure antennas, composed of relatively movable parts or of flexible material so that could be folded or collapsed to occupy less space when not in use. Such methods are particularly popular in the military and satellite communications, for obvious reasons.

U.S. Pat. No. 4,115,784 to Schwerdtfeger, et al. discloses a deployable ground plane antenna for use aboard a satellite or the like, with the antenna and erection mechanism being compactly stowable within the confines of a launch vehicle. After ejection of the satellite from the launch vehicle, the ground plane antenna self-deploys on removal of a single cable restraint.

U.S. Pat. No. 5,909,197 to Heinemann et al. discloses a Deployable helical antenna, comprised of a top and a bottom plate, and a deployable structure fitted between the plates which can forcibly separate the plates and extend a helical antenna placed between the plates.

Yet the structures disclosed by Schwerdtfeger and Heinemann are quite big and complex, perhaps suitable to satellites but less practical for small and portable devices.

In the recent years, portable communication devices for personal use were introduced to the market, operating at relatively low frequencies, such as VHF and low UHF. One prominent case is about Personal Locator Beacons (PLBs) for Search and Rescue (SAR) of people in distress. Some of these PLBs operate at 121.5 MHz, i.e. $\lambda=2470$ mm, others operate at 406 MHz, i.e. $\lambda=740$ mm Concerning these wavelengths, a $\lambda/4$ antenna is hardly compact enough to be part of a personal device carried or worn by a user, particularly when the user is required to use his/her hands while swimming or climbing, and so on. For such uses, deployable or collapsible antennas may provide a fair solution also for small and portable communication devices, since the antenna could be most of the time stowed in a low profile, and deployed, when needed to achieve full radiation performance.

U.S. Pat. No. 5,559,760 to Schneider (Breitling) discloses a wristwatch comprising a high-frequency transmitter and an extensible antenna in the form of two wires wound up in two different housings of the watch before use; the antenna being unfurled by pulling on plugs fastened to each end of the antennas. The dipole antenna of this device is configured that once been extended, does not flex but remains straight. Yet, Schneider's dipole antenna is quite long and not so friendly to use.

U.S. Pat. No. 7,586,463 to Katz discloses Extendable helical antenna for personal communication device. According to Katz, a helical antenna is placed over a ground plane, packaged in a case with a rigid cover, the helical antenna made of an elastic conductive spring configured to change its height along its axis, pressed down between said case and said cover or extended to a higher height. Still, the small helix antenna disclosed by Katz, known to operate in the normal mode, poorly radiates to the zenith, so is limited in communicating with high elevation satellites.

U.S. Pat. No. 7,038,634 to Bisig discloses a loop antenna embedded in a wristband portion of a watch. This invention provides a compact solution to an antenna embedded in a wrist watch, however it is typically applied to receive FM radio broadcast, and is not efficient enough to be used in a transmitter, and neither obtains a radiation pattern with good performance at high elevation angles, so is not very practical for communication with high elevation satellites.

A wrist worn transmitter is particularly useful for Search and Rescue of people in distress. Adventurers, travelers, boaters, sailors, pilots, and outdoorsmen run a constant risk that something will go wrong, and will subsequently find themselves in need of rescue services. Such people require a device that can call for rescue in emergency situations, whether at sea, on land, or in the air.

There are already such devices in the market, named Personal Locator Beacons (PLBs), made to broadcast distress signals detectable by satellites and relayed to terrestrial search and rescue centers. The most prominent satellite system for Search and Rescue is Cospas-Sarsat (C/S), operating worldwide since 1982 and been instrumental in saving about 40,000 people from then, by detecting and locating signals broadcast from PLBs or alike beacons/terminals (named EPIRBs and ELTs).

Emergency situations relevant to Search and Rescue arise by nature at unexpected moments, when the user might not be prepared, such as when falling overboard a vessel, in snow avalanche, or due to equipment failure during climbing. Then, it is mostly desirable that a PLB, detectable by satellites, be attached to the user's body on a permanent basis. In particular, a wrist worn PLB is mostly practical in such cases. Furthermore, a small and efficient and robust antenna is vital for such applications.

State of the art Search and Rescue satellite systems use independent methods to locate the beacon, not necessarily based on Global Navigation Satellite Systems (GNSSs) positioning services. For example, the beacon localization in the Cospas-Sarsat system segment named MEOSAR (Medium Earth Orbiting Search and Rescue) is based on the capability of a base station to monitor the beacon signal been relayed by three or more satellites. Measuring the relayed signal Time of Arrival (ToA) and Frequency of Arrival (FoA) provides information enabling resolving the beacon position. Since this MEOSAR employs Medium Earth Orbiting satellites to relay signals broadcast from terrestrial beacons, and since these satellites are deployed substantially symmetrically around the earth, it would be mostly desirable that beacons activated from the earth, will obtain a radiation pattern covering all the visible sky, i.e. any elevation angle above the horizon up to the zenith. In other words, the required antenna should be isotropic, or at least semi isotropic, covering the hemisphere above the horizon.

Since antennas have no active components, they do not amplify RF energy or increase the overall signal energy provided by a coupled transmitter; rather antennas shape the direction of the radiated energy into a specific pattern. Wired Dipole and Monopole antenna generate an Omni-directional (in azimuth) toroidal shaped wave pattern, i.e. reducing power at high elevation angles, measured from the horizon, vanishing towards the zenith and nadir.

The isotropic radiation pattern can prevent deterioration of communication quality caused by nulls. Thus, antennas with isotropic radiation pattern are very adaptable to portable communication products, especially handheld products and furthermore to satellite terminals, where signals are expected to arrive from or be transmitted to all directions in azimuth, but also to all elevation angles.

U.S. Pat. No. 7,948,446 to Barone discloses a XYZ isotropic radiator antenna characterized by three whip antennas connected with a housing and arranged 90 degrees perpendicular to each other. Yet, the three whip antennas turn to be quite long in VHF and UHF and could hardly be considered as an Electrically Small Antenna for a small portable communication device.

U.S. Pat. No. 8,264,418 to Huang discloses a planar antenna with an isotropic radiation pattern, including a substrate, a dipole antenna, a microstrip line set, and a channel selection module. The dipole antenna is disposed on a first surface of the substrate, and the microstrip line set and the channel selection module are disposed on a second surface of the substrate. However, this antenna is likely to have low efficiency, due to high self-loading in substrate and microstrip geometry.

U.S. Pat. No. 8,390,516 to Parsche discloses a Planar antenna having isotropic radiation pattern and based on an epicyclic structure. The antenna device includes an electrical conductor extending on a substrate and having at least one gap therein, and with an outer ring portion to define a radiating antenna element, and at least one inner ring portion to define a feed coupler and connected in series with the outer ring portion and extending within the outer ring portion. Yet this antenna obtains a 0.124 wavelength (lambda) diameter (without further loading), which still seems to be too large for a wrist worn device at VHF or UHF; also, this antenna radiates in Horizontal polarization, which might not match the typically Vertical polarization of the remote antenna with which it is desired to communicate; moreover, the dipole nature of Parsche's antenna, opposed to a monopole that uses a ground plane reference, might also be a disadvantage in the presence of nearby metallic bodies.

Present art methods have not yet provided satisfactory solutions for efficient isotropic radiating electrically small antennas, particularly in VHF and UHF bands.

It is then an object of the present invention to provide a portable communication device and antenna thereto, the antenna obtaining high efficiency and substantial isotropic radiation pattern.

It is another object of the present invention to provide a communication device and antenna well adopted to communicate with and be located by satellites viewed at any elevation above the horizon.

It is also an object of the present invention to provide a communication device and antenna, both compact and user friendly enough to be carried and operated by a person.

It is still an object of the present invention to provide a communication device and antenna compact and user friendly enough to be carried by a person engaged in physical activity, and operated in emergency situations.

It is yet another object of the present invention to provide a communication device and antenna suitable for a wrist-worn Personal Locator Beacon (PLB) served by satellites.

It is yet an object of the present invention to provide a communication device and antenna enabling a satellite base station to use as many satellites, in the most possible favorable geometry, to accurately determine the location of said communication device.

Other objects and advantages of the invention will become apparent as the description proceeds.

SUMMARY OF THE INVENTION

The present invention discloses a portable communication device comprising an extendable antenna, said antenna comprising a first planar radiating element, a second planar radiating element, a feeding conductor and a ground plane; the feeding conductor perpendicular to said ground plane and coupled to both said radiating elements, electrically in parallel; said first radiating element geometrically parallel to said ground plane, and said second radiating element configured to move between two positions: a) stowed, in which said second radiating element is parallel to said first radiating element; b) operational, in which said second radiating element is perpendicular to said first radiating element, and in this position configured to provide a substantially isotropic radiation pattern.

Further in the disclosed device, at least one of the radiating elements is configured as a conductive wire in shape of an open loop; preferably, both radiating elements are in shape of an open loop.

As appreciated by a person skilled in the art, such loop can be shaped in various ways, such as round or oval or rectangular, polygonal or any combination thereof. Preferably, the loop is open, by a gap that discontinues the wire conductivity, however depending on its specific dimensions vs. the operating frequency, and considering also the specifically desired radiation pattern, this gap may be closed or bridged over by electrical components such as capacitors and inductors that change its electromagnetic characteristics at a specific frequency. The loop may also be configured with meanders, i.e. sectors that deviate from the main perimeter in order to add some electrical length, enabling tuning the antenna to lower frequencies.

Preferably, the ground plane and loop are configured in substantially similar external dimensions; for example, a round loop with a specific diameter over a round ground plane with similar diameter, or a rectangular loop with certain width and height, over a ground plane with similar width and height.

Preferably, these external dimensions are smaller than 10% of a wavelength at which said device is tuned to communicate, i.e. a wavelength associated with one of the antenna's resonance frequencies (usually the lowest resonance frequency). For example, at 406 MHz the wavelength is 740 mm, and experiments showed that an antenna made according to the present invention, configured with round loops above a round ground plane, each with a diameter of about 55 mm could be tuned to this frequency and provide isotropic radiation. Experiments also showed that an antenna made according to the present invention with rectangular loops above a rectangular ground plane, each with approximately width=55 mm and height=45 mm, could be tuned to this frequency and provide isotropic radiation The isotropic radiation pattern is achieved, as a skilled person may appreciate, by the superposition of the radiation emitted (or received) by the first radiating element and the second radiating element; the first element, been an electrically small open loop with axis perpendicular to the ground plane, radiates as a monopole, i.e. mainly contributing to the radiation by the horizon plus/minus 30-40 degrees of elevation; while the second element, also an electrically small open loop but with axis parallel to the ground plane, also radiates as a monopole but with maximum power by the zenith (straight up) and nadir (straight down); the combination thereof provides isotropic radiation, typically plus/minus 2 dB over all spherical coordinates.

Further in the disclosed device, the antenna is configured with a short conductor electrically connecting said ground plane with said first radiating element, typically nearby the feeding conductor. The term "short" is associated here with electrically shorting, i.e. connection to the electric negative pole, or to the ground plane in the present context, still this conductor is typically also short in length. This shorting method, sometimes known in the art as Gamma match, is mainly provided to improve the antenna matching, i.e. decrease the return loss; experiments made on a prototype antenna according to the present invention showed S11<−14 dB, achieved with such shorting conductor.

Preferably, the antenna in the disclosed device further comprises a hinge by the feeding conductor, configured to enable the second radiating element rotating in 90 degrees from vertical to horizontal position and vice versa. This hinge, which could be also referred to as a pivot, is configured with a horizontal axis, i.e. axis parallel to the ground plane, and as a skilled person may appreciate, it is important that this hinge enabling the 90 degrees rotation will still keep good connectivity, i.e. low electrical resistance between the second radiating element and the feeding conductor, at least at the vertical position of the second radiating element, which is the operational position.

Further, the disclosed device comprises a display, the display placed above said ground plane, and the second radiating element configured not to obstruct the display while in stow position.

A display is typically a useful part of a personal communication device, instrumental in indicating the device status assisting the user with the operation. However, the real estate on which the display is typically placed is sometimes also the preferred place for an antenna to be placed on, or at least be fed from, so advantageously the disclosed invention suggests a way to keep the display visible and still configure an efficient and isotropic antenna. It is relevant to mention here that it is well known in the art that patch antennas may be configured to have good upper hemisphere radiation, so could have potentially been used for satellite communications, however a patch antenna might need to cover a large area above the center part of the ground plane, not leaving much place for such a display.

In the disclosed device at least one of said radiating elements is configured on a printed circuit board (PCB); preferably, both radiating elements are configured on printed circuits, each on a different PCB. As could be appreciated by a person skilled in the art, printing the antenna elements on PCBs is mostly convenient in terms of manufacturing and cost. Since both radiating elements are substantially planar in nature, as is a PCB, the use of PCBs here is quite natural.

Further, the disclosed device may comprise a radio, been a receiver and/or a transmitter; said radio placed on said ground plane, at either or both its sides, and coupled to said feeding conductor.

As a skilled person may appreciate, this is another way to achieve a compact device design, using the ground plane for two purposes: as a reference pole for the antenna, and substrate for radio components. Hence, practically, the antenna external dimensions define the external dimensions of the entire communication device.

Further, the disclosed device is configured to be worn, wherein the antenna ground plane configured to be placed between the first radiating element and the human body; preferably the device is configured to be wrist worn, as a wrist watch, so its antenna ground plane is close to the wrist, though not necessarily touching the human body.

Further, the disclosed device is configured to communicate with satellites orbiting around the earth; preferably, the device is configured as a Personal Locator Beacon, detectable by satellites or via satellites, at a remote base station.

The present invention is also directed to an extendable antenna, comprising a first planar radiating element, a second planar radiating element, a feeding conductor and a ground plane; the feeding conductor perpendicular to said ground plane and coupled to both said radiating elements, electrically in parallel; said first radiating element geometrically parallel to said ground plane, and said second radiating element configured to move between two positions: a) stowed, in which said second radiating element is parallel to said first radiating element; b) operational, in which said second radiating element is perpendicular to said first radiating element, and in this position configured to provide a substantially isotropic radiation pattern.

Further, the disclosed antenna has at least one of its radiating elements configured as a conductive wire in shape of an open loop; preferably, both radiating elements are configured in shape of an open loop. This open loop may be shaped in various ways, having various segments in series, each segment possibly round or straight, depicting small or large parts of a circle, ellipse or rectangle, polygon or any combination thereof. Preferably, the loop is open, by a gap that discontinues the wire conductivity, however depending on its specific dimensions vs. the operating frequency, and considering also the specifically desired radiation pattern, this gap can be closed or bridged over by electrical components such as capacitors and inductors. In addition, the loop may also have meanders, i.e. sectors that deviate from the main perimeter adding electrical length and enabling tuning the antenna to lower frequencies.

Preferably, the antenna ground plane and loops are configured in substantially similar external dimensions; furthermore, preferably, the loop is basically configured to track the border of the ground plane, either in straight or round lines.

Preferably, the external dimensions (such as diameter, width and height) of the antenna ground plane and radiating elements are smaller than 10% of a wavelength at which the antenna is tuned to radiate, i.e. the wavelength associated with its resonance frequency.

Further, the disclosed antenna is configured with a short conductor electrically connecting said ground plane with said first radiating element.

Preferably, the antenna further comprises a hinge by the feeding conductor, configured to enable the second radiating element rotating in 90 degrees from vertical to horizontal position. This hinge or pivot, obtains a horizontal axis, and configured keeping low electrical resistance between the second radiating element and the feeding conductor.

Preferably in the disclosed antenna, the second radiating element is configured such that when stowed it will not obstruct the center part of the ground plane. This could be instrumental for viewing a display placed on the ground plane.

Further in the disclosed antenna, at least one of the radiating elements is configured on a printed circuit board (PCB); preferably, each of the radiating elements is configured on a separate PCB.

Further, the disclosed antenna is configured to enable placing radio components on the ground plane, this radio been a transmitter and/or receiver, coupled to the feeding conductor.

Further, the disclosed antenna is configured in a device, enabling to be worn, wherein the antenna ground plane configured to be placed between the first radiating element and the human body; preferably this device is wrist worn, as a wrist watch, so the disclosed antenna ground plane is close to the wrist, though not necessarily touching the human body.

Further, the disclosed antenna is configured to communicate with remote antennas onboard satellites orbiting around the earth, at any elevation angle above the horizon; preferably, this device is a Personal Locator Beacon, detectable by satellites or via satellites, at a remote base station.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIGS. 1a and 1b illustrate an Extendable Round Antenna according to a first embodiment of the present invention, comprising first and second round radiating elements, a round ground plane, a feeding conductor and a short (or shorting) conductor; the antenna is shown in two different positions: FIG. 1a showing the stowed position, where the second radiating element is in parallel to the first radiating element; and FIG. 1b showing the operational position, where the second radiating element is vertical to the first radiating element. Each of the two radiating elements is configured as a planar open loop, with a gap near the feeding conductor. The feeding conductor and short conductor are shown to be perpendicular to the ground plane; the feeding conductor coupled to both radiating elements, electrically in parallel; and the short conductor electrically connecting the ground plane to the first radiating element.

FIGS. 2a and 2b illustrate an Extendable Rectangular Antenna according to a second embodiment of the present invention, comprising first and second rectangular radiating elements, a rectangular ground plane, a feeding conductor and a short (or shorting) conductor; the antenna is shown in two different positions: FIG. 2a showing the stowed position, where the second radiating element is in parallel to the first radiating element; and FIG. 2b showing the operational position, where the second radiating element is vertical to the first radiating element. Each of the two radiating elements is configured as a planar open loop, with a gap near the feeding conductor. The feeding conductor and short conductor are shown to be perpendicular to the ground plane, the feeding conductor coupled to both radiating elements, electrically in parallel, and the short conductor electrically connecting the ground plane to the first radiating element.

FIG. 3 shows an Antenna according to the present invention, where both the first and second radiating elements are configured on a Printed Circuit Board (PCB). Depicted are a ground plane and a feeding conductor perpendicular thereto, coupled electrically in parallel to the two radiating elements, each in form of a planar open loop printed on a PCB.

FIG. 4 depicts an upper view of an Antenna according to the present invention, in Stowed Position with Display Onboard ground plane. First and a second radiating element are shown in parallel, above the ground plane, each configured as a planar open loop such that the display is not obstructed from upper view.

FIGS. 5a and 5b illustrate an Extended Antenna according to the present invention, comprising two radiating elements, a ground plane, a feeding conductor, a shorting conductor and a hinge at the feeding conductor; the hinge schematically depicted as a horizontal cylinder, placed on the feeding conductor between the connection to the first radiating element and the connection to the second radiating element; the antenna is shown in two views: FIG. 5a showing a front view, and FIG. 5b showing a side view. FIG. 5b further indicating that the second radiating element can rotate in 90° around the axis of the horizontal cylinder depicting the hinge, moving from vertical (extended, for operational purposes) to horizontal (stowed) position.

FIG. 6 illustrates an Antenna according to the present invention, worn on a human wrist. Only parts of the antenna are depicted showing a ground plane close to the wrist, and the first radiating element more distant from the wrist.

FIG. 7 illustrates a Block Diagram of a Communication Device with Extended Antenna, according to the present invention. Four blocks are indicated to be onboard the ground plane (ground plane not shown): a radio, microcontroller, input devices and a display. Coupled to the radio is shown a feeding conductor (thick vertical line), which in turn is coupled to both the first radiating element (thin horizontal line) and the second radiating element (thin vertical line).

FIG. 8 depicts the present invention antenna radiation pattern, in Elevation cuts, according to simulated results. Three cuts are shown each indicating the antenna gain in dBi around 360° of azimuth: Theta=90° (horizon), Theta=0° (zenith) and Theta=45°. It can be seen that the radiation is substantially isotropic, up to about −/+2 dB.

DETAILED DESCRIPTION

The present invention discloses a portable communication device comprising an extendable antenna, said antenna comprising a first substantially planar radiating element, a second substantially planar radiating element, a feeding conductor and a ground plane; the feeding conductor configured substantially perpendicular to said ground plane and coupled to both said radiating elements, electrically in parallel; said first radiating element configured geometrically in parallel to said ground plane, and said second radiating element configured to move between two positions: a) stowed, in which said second radiating element is substantially parallel to said first radiating element; b) operational, in which said second radiating element is substantially perpendicular to said first radiating element, and in this position configured to provide a substantially isotropic radiation pattern.

The disclosed device has at least one of its radiating elements configured as a conductive wire in shape of an open loop; preferably, both radiating elements are in shape of an open loop.

Preferably, in the disclosed device the ground plane and radiating elements are configured with substantially similar external dimensions.

FIG. 1 illustrates an Extendable Round Antenna according to a first embodiment of the present invention, comprising first and second round radiating elements, a round ground plane, a feeding conductor and a short (or shorting) conductor; the antenna is shown in two different positions: FIG. 1a showing the stowed position, where the second radiating element is in parallel to the first radiating element; and FIG. 1b showing the operational position, where the second radiating element is vertical to the first radiating element. Each of the two radiating elements is configured as a planar open loop, with a gap near the feeding conductor. The feeding conductor and short conductor are shown to be perpendicular to the ground plane; the feeding conductor coupled to both radiating elements, electrically in parallel; and the short conductor electrically connecting the ground plane to the first radiating element.

According to the first embodiment of the present invention, the ground plane is essentially round, its perimeter basically following a circle having a diameter of approximately 56 mm; the first and second radiating elements are also round, with external diameter of 56 mm, each with a narrow gap of 3-5 mm by the feeding conductor, as illustrated in FIG. 1.

According to a second embodiment of the present invention, the ground plane is rectangular, with a width of 54 mm and height of 44 mm; both its first and second radiating elements also rectangular, with width of 54 mm and height of 44 mm, plus/minus some millimeters, each with a narrow gap of 3-5 mm by the feeding conductor.

FIG. 2 illustrates an Extendable Rectangular Antenna according to the second embodiment of the present invention, comprising first and second rectangular radiating elements, a rectangular ground plane, a feeding conductor and a short (or shorting) conductor; the antenna is shown in two different positions: FIG. 2a showing the stowed position, where the second radiating element is in parallel to the first radiating element; and FIG. 2b showing the operational position, where the second radiating element is vertical to the first radiating element. Each of the two radiating elements is configured as a planar open loop, with a gap near the feeding conductor. The feeding conductor and short conductor are shown to be perpendicular to the ground plane, the feeding conductor coupled to both radiating elements, electrically in parallel, and the short conductor electrically connecting the ground plane to the first radiating element.

Preferably, any of said external dimensions is smaller than 10% of a wavelength at which said device is tuned to communicate.

Both the first and second embodiments are configured to emit RF signals at 406 MHz, and since the wavelength associated with 406 MHz is 740 mm, then the external dimensions configured according to the first and second embodiments, 56 mm and 54 mm respectively, are about 7.5% of the operational wavelength.

Preferably, the present device is configured with a short conductor electrically connecting the ground plane with the first radiating element, as can be seen in FIG. 1 and FIG. 2. Measurements made on antennas built according to the first and second embodiments of the present invention indicate that a distance of about 15 mm between the feeding conductor and shorting conductor may provide a good return loss, better than −14 dB.

As already discussed, the isotropic radiation pattern is achieved by the superposition of the radiation emitted by the first radiating element in vertical position and the second radiating element in horizontal position; in particular, according to the first and second embodiments of the present invention, both radiating elements are small open loops, compared to the resonance frequency wavelength, so both loops radiate as short monopoles, with a typical toroidal shaped radiation pattern, however since one toroid obtains a vertical axis and the other has a horizontal axis, the two toroidal patterns combine to a substantially full spherical pattern.

FIG. 8 shows simulated results of antenna radiation pattern according to the first and second embodiments of the present invention (apparently, the round and the rectangular antennas have similar radiation patterns). Three cuts are shown each indicating the antenna gain in dBi around 360° of azimuth: Theta=90° (horizon), Theta=0° (zenith) and Theta=45°. It can be seen that the radiation is substantially isotropic, up to about −/+2 dB. The graphs indicate the Realized Gain, meaning that the return loss is also accounted for.

Further according to the first embodiment of the present invention, the device comprises a hinge by the feeding conductor, configured to enable the second radiating element rotating in 90 degrees from vertical to horizontal position and vice versa.

FIG. 5 illustrates an Extended Antenna according to the present invention, comprising two radiating elements, a ground plane, a feeding conductor, a shorting conductor and a hinge at the feeding conductor; the hinge schematically depicted as a horizontal cylinder, placed on the feeding conductor between the connection to the first radiating element and the connection to the second radiating element; the antenna is shown in two views: FIG. 5a showing a front view, and FIG. 5b showing a side view. FIG. 5b further indicating that the second radiating element can rotate in 90° around the axis of the horizontal cylinder depicting the hinge, moving from vertical (extended, for operational purposes) to horizontal (stowed) position.

As already mentioned, it is important that this hinge, although enabling a relative movement between the second radiating element and the feeding conductor, will still keep good connectivity between these two. Considering that configuring the antenna for easy rotation might somehow be in contrast with good electrical connectivity, it could be useful to add a short flexible electrical connection between the upper part of feeding conductor and a close point on the first radiating element; such connection conveniently implemented by a flexible metallic wire or strap or braided band (such as those used for de-soldering/soldering remove) firmly attached respectively at its both sides to the feeding element and second radiating element; obviously, if such an auxiliary conductor is used, the antenna should be accordingly and carefully tuned, while in operational position, and then the hinge could be configured to serve as a mechanical joint but not necessarily electrically conducting.

According to the first and second embodiments of the present invention, this portable communication device is configured as a Personal Locator Beacon (PLB), for Search and Rescue of people in distress, to be detected and located via satellites associated with the international Cospas-Sarsat system.

So further, the disclosed device comprises a radio been at least one of: receiver, transmitter; said radio placed on the antenna ground plane and coupled to the feeding conductor; according to the first and second embodiments of the present invention, this radio is a 406 MHz 4 watts transmitter, configured to broadcast short bursts upon which the device can be located via satellites; this transmitter is implemented by chips and discrete components placed on the ground plane; practically, this is a multi-layer PCB which one of its layers is almost entirely printed with metallic coating implementing the ground plane, and the radio components assembled on either or both external layers of this PCB.

Preferably, this PLB is configured to be wrist worn, wherein the ground plane configured to be placed between the first radiating element and the human body.

FIG. 6 illustrates an Antenna according to the first and second embodiments of the present invention, worn on a human wrist. Only parts of the antenna are depicted, in a side view, depicting a ground plane close to the wrist, and the first radiating element been more distant from the wrist. Preferably, the device is packaged in a plastic structure, so the internal electronic components, including ground plane, do not directly touch the human body.

FIG. 7 illustrates a Block Diagram according to the first and second embodiments of the present invention. Four blocks are indicated to be implemented onboard the ground plane (the ground plane itself not shown): a radio, microcontroller, input devices and a display. Coupled to the radio is shown a feeding conductor (thick vertical line), which in turn is coupled to both the first radiating element (thin horizontal line) and the second radiating element (thin vertical line).

Obviously, the display indicated in FIG. 7 should be configured such that the user will easily see it, to guide him/her in the operation of the device; so preferably, the disclosed device comprises a display, placed on the antenna ground plane, and the second radiating element is configured such that when stowed it does not obstruct the display. This is shown in FIG. 4, illustrating from an upper view an Antenna according to the first embodiment of the present invention, in stowed position with display onboard the ground plane. First and a second radiating element are shown to be in parallel, above the ground plane, both configured as open loops such that the display is not obstructed from upper view.

Further, at the disclosed device, at least one of said radiating elements is configured on a printed circuit board (PCB); according to the first embodiment of the present invention, both the first and second radiating elements are printed, each on a separate PCB, having a trace width of 2-3 mm.

FIG. 3 shows the Antenna according to the first embodiment of the present invention, where both the first and second radiating elements are configured each on a Printed Circuit Board (PCB). Depicted are a ground plane and a feeding conductor perpendicular thereto, coupled electrically in parallel to the two radiating elements, each in form of a planar open loop printed on a PCB.

As may be appreciated by a person skilled in the art, printing the metallic elements of the antenna on a PCB changes the resonance frequency of the antenna, compared to the case where similar metallic elements are free in the air, due to the different dielectric constant of air and PCB substrate. In this context, the material type of the PCB substrate makes a difference, and also the thickness of the PCB. Typically, standard FR4 PCB can be used, bearing a dielectric constant of approximately 4 (air is 1), and 1-2 mm of thickness appears to be a practical choice.

The present invention is also directed to an extendable antenna, comprising a first substantially planar radiating element, a second substantially planar radiating element, a feeding conductor and a ground plane; the feeding conductor configured substantially perpendicular to said ground plane and coupled to both said radiating elements, electrically in parallel; said first radiating element configured substantially geometrically in parallel to said ground plane, and said second radiating element configured to move between two positions: a) stowed, in which said second radiating element is substantially parallel to said first radiating element; b) operational, in which said second radiating element is substantially perpendicular to said first radiating element, and in this position configured to provide a substantially isotropic radiation pattern.

The disclosed antenna has at least one of its radiating elements configured as a conductive wire in shape of an open loop; preferably, both radiating elements are configured in shape of an open loop; this loop configured with any combination of round/curved/straight lines or segments.

The basic structure of the disclosed antenna is depicted in FIG. 1 and FIG. 2, and simulated results of these models are shown in FIG. 8 (the round antenna per FIG. 1 and rectangular antenna per FIG. 2 appear to provide similar radiation patterns).

Preferably, the antenna ground plane and loops are configured in substantially similar external dimensions (such as diameter, width, height); furthermore, preferably, the loop is basically configured to track the border of the ground plane, either in straight and/or curved lines.

Typically, the ground plane and radiating elements external dimensions are smaller than 10% of a wavelength at which said device is tuned to radiate.

Further, the disclosed antenna is configured with a short conductor connecting said ground plane with said first radiating element.

Preferably, the antenna further comprises a hinge at the feeding conductor, configured to enable the second radiating element rotating in 90 degrees from vertical to horizontal position. This hinge (or pivot), configured with a horizontal axis, and keeping low electrical resistance between the second radiating element and the feeding conductor. This hinge is depicted in FIG. 5a (front view) and FIG. 5b (side view).

Preferably in the disclosed antenna, the second radiating element is configured such that when stowed it will not obstruct the center part of the ground plane. This could be instrumental to enable placing a display on the ground plane, as depicted in FIG. 4.

In the disclosed antenna at least one of said radiating elements is configured on a printed circuit board (PCB); preferably, both radiating elements are configured on printed circuits, each on a different PCB, as depicted in FIG. 3.

Further, the disclosed antenna is configured to enable placing radio components on the ground plane, this radio been a transmitter and/or receiver, coupled to the antenna feeding conductor.

Further, the disclosed antenna is configured in a device, enabled to be worn, wherein its ground plane configured to be placed between its first radiating element and the human body, as depicted in FIG. 6; preferably this device is wrist worn, as a wrist watch, so the disclosed antenna ground plane is close to the wrist, though not necessarily touching the human body.

Further, the disclosed antenna is configured to communicate with remote antennas onboard satellites orbiting around the earth; preferably, this antenna is configured in a Personal Locator Beacon, detectable by satellites or via satellites, at base stations.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention. In this context, though the invention specifically refers to the Cospas-Sarsat satellite system, associated with specific parameters such as radiation frequency, it is definitely not bounded to this particular system and associated parameters, and its scope is well beyond any specific communication or navigation system or any specific radio type or system or frequency.

The invention claimed is:

1. A portable communication device comprising an extendable antenna, said antenna comprising a first substantially planar radiating element, a second substantially planar radiating element, a feeding conductor and a ground plane; the feeding conductor configured substantially perpendicular to said ground plane and coupled to both said radiating elements, electrically in parallel; said first radiating element configured geometrically in parallel to said ground plane, and said second radiating element configured to move between two positions: a) stowed, in which said second radiating element is substantially parallel to said first radiating element; b) operational, in which said second radiating element, wherein:
   a. said first and second radiation elements configured to resonate at a substantially similar frequency;
   b. said radiating elements configured such that the superposition of their radiation patterns will form a substantially isotropic radiation pattern;
   c. said ground plane being a metallic surface part of said portable device.

2. A device according to claim 1, wherein at least one of said radiating elements configured as a conductive wire in shape of an open loop.

3. A device according to claim 2, wherein said ground plane and said loop configured in substantially similar external dimensions.

4. A device according to claim 3, wherein any of said external dimensions is smaller than 10% of a wavelength at which said device is tuned to communicate.

5. A device according to claim 1, further configured with a short conductor electrically connecting said ground plane with said first radiating element.

6. A device according to claim 1, further comprising a hinge by the feeding conductor, configured to enable the second radiating element rotating in 90 degrees from vertical to horizontal position.

7. A device according to claim 1, further comprising a display, placed above said ground plane, and said second radiating element configured not to obstruct the display in stow position.

8. A device according to claim 1, wherein at least one of said radiating elements is configured on a printed circuit board (PCB).

9. A device according to claim 1, further comprising a radio been at least one of: receiver, transmitter; said radio placed on said ground plane and coupled to said feeding conductor.

10. A device according to claim 1, configured to be worn, wherein said ground plane configured to be placed between said first radiating element and the human body.

11. An extendable antenna, comprising a first substantially planar radiating element, a second substantially planar radiating element, a feeding conductor and a ground plane; the feeding conductor configured substantially perpendicular to said ground plane and coupled to both said radiating elements electrically in parallel; said first radiating element configured geometrically in parallel to said ground plane, and said second radiating element configured to move between two positions: a) stowed, in which said second radiating element is substantially parallel to said first radiating element; b) operational, in which said second radiating element is substantially perpendicular to said first radiating element, wherein:
   a. said first and second radiation elements configured to resonate at a substantially similar frequency;
   b. said radiating elements configured such that the superposition of their radiation patterns will form a substantially isotropic radiation pattern.

12. An antenna according to claim 11, wherein at least one of said radiating elements configured as a conductive wire in shape of an open loop.

13. An antenna according to claim 12, wherein said ground plane and said loop configured in substantially similar external dimensions.

14. An antenna according to claim 13, wherein any of said external dimensions is smaller than 10% of a wavelength at which said antenna is tuned to radiate.

15. An antenna according to claim 11, further configured with a short conductor electrically connecting said ground plane with said first radiating element.

16. An antenna according to claim 11, further comprising a hinge by the feeding conductor, configured to enable the second radiating element rotating in 90 degrees from vertical to horizontal position.

17. An antenna according to claim 11, further said second radiating element configured not to obstruct the center part of said ground plane in stow position.

18. An antenna according to claim 11, wherein at least one of said radiating elements is configured on a printed circuit board (PCB).

19. An antenna according to claim 11, configured to be coupled to a personal communication device.

20. An antenna according to claim 11, configured to communicate with remote antennas onboard satellites orbiting around the earth.

* * * * *